United States Patent

Mashuda

[11] 3,863,848
[45] Feb. 4, 1975

[54] GIANT TREE CHOPPER
[76] Inventor: David J. Mashuda, R.D. No. 1, Evans City, Pa. 16033
[22] Filed: Jan. 2, 1974
[21] Appl. No.: 430,192

[52] U.S. Cl. .............................. 241/101.7, 241/92
[51] Int. Cl. ............................................ B02c 21/02
[58] Field of Search ........ 241/101.7, 101 M, 186 R, 241/186.4, 92; 83/370

[56] References Cited
UNITED STATES PATENTS

| | | | |
|---|---|---|---|
| 3,062,460 | 11/1962 | Bunney | 241/92 |
| 3,545,692 | 12/1970 | Burkett | 241/101.7 |
| 3,550,653 | 12/1970 | Gauthier et al. | 83/370 X |
| 3,559,898 | 2/1971 | Rinke | 241/101.7 |
| 3,752,409 | 8/1973 | Lewis | 241/101.7 X |
| 3,822,042 | 7/1974 | Roy | 241/101.7 X |

*Primary Examiner*—Roy Lake
*Assistant Examiner*—E. F. Desmond
*Attorney, Agent, or Firm*—Buell, Blenko and Ziesenheim

[57] ABSTRACT

A vehicular equipment used particularly for destruction of trees and brush at construction sites by grinding them up into a mulch for easy disposal or other use; the equipment consisting of a vehicular chassis upon which a feeder trough is adaptable to receive cut-down trees, hydraulic breaker arms on opposite sides of the trough being suitable to break and fold the limbs of larger trees close to the tree trunk so the trunk can then be pulled by a cleated feeder wheel toward a rotating cutter wheel in which rotating knife blades chip away the tree, the chips being blown or thrown out by chip scoops mounted on the outer edge of the cutter wheel.

5 Claims, 5 Drawing Figures

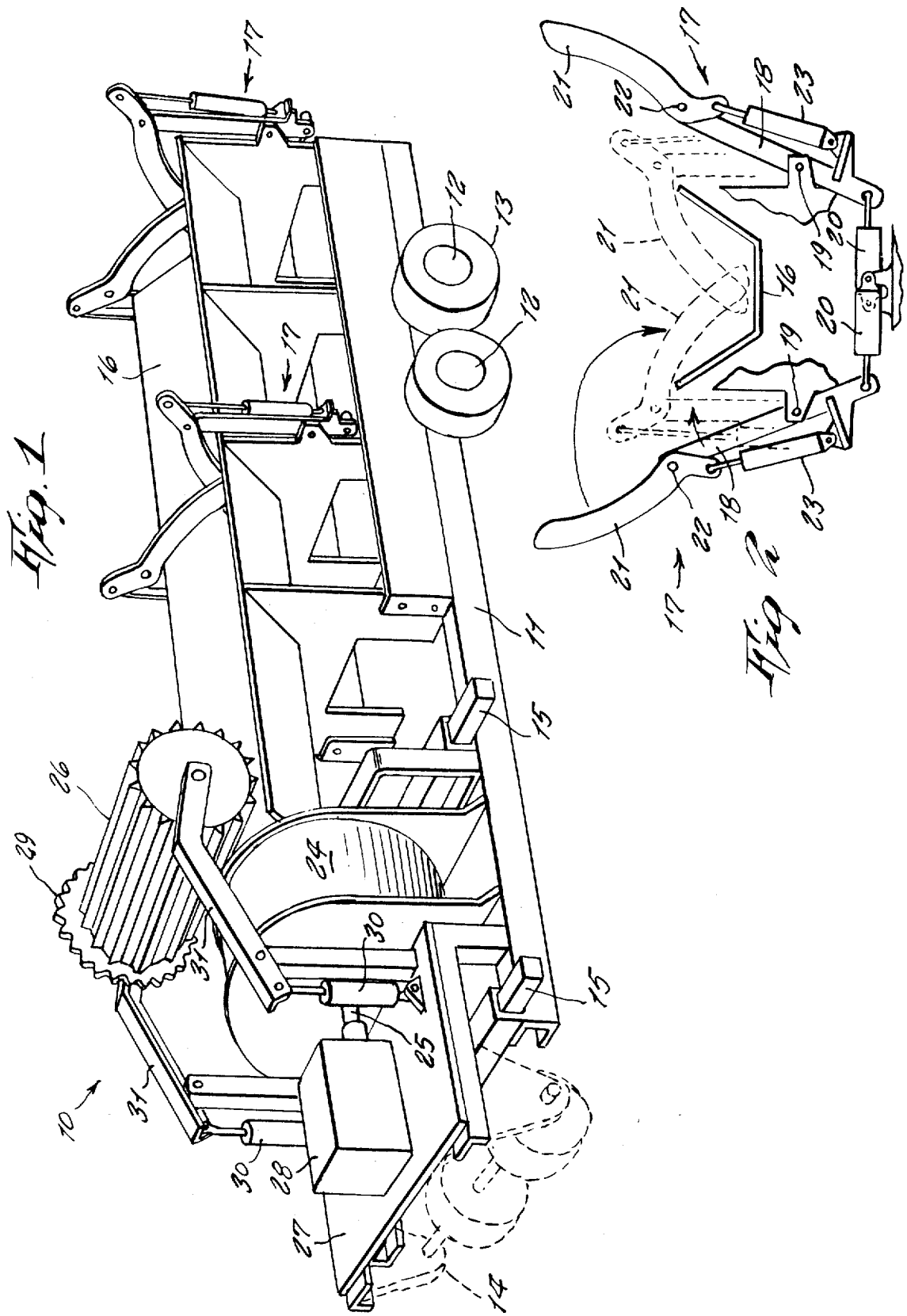

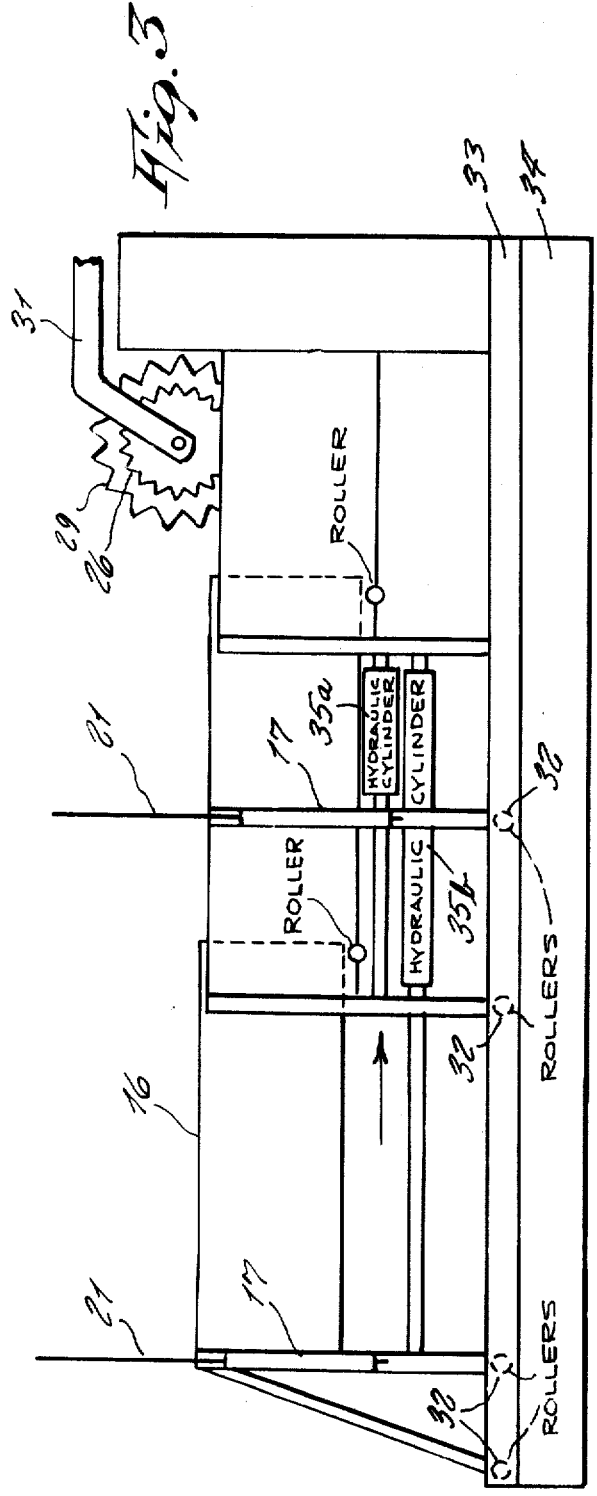
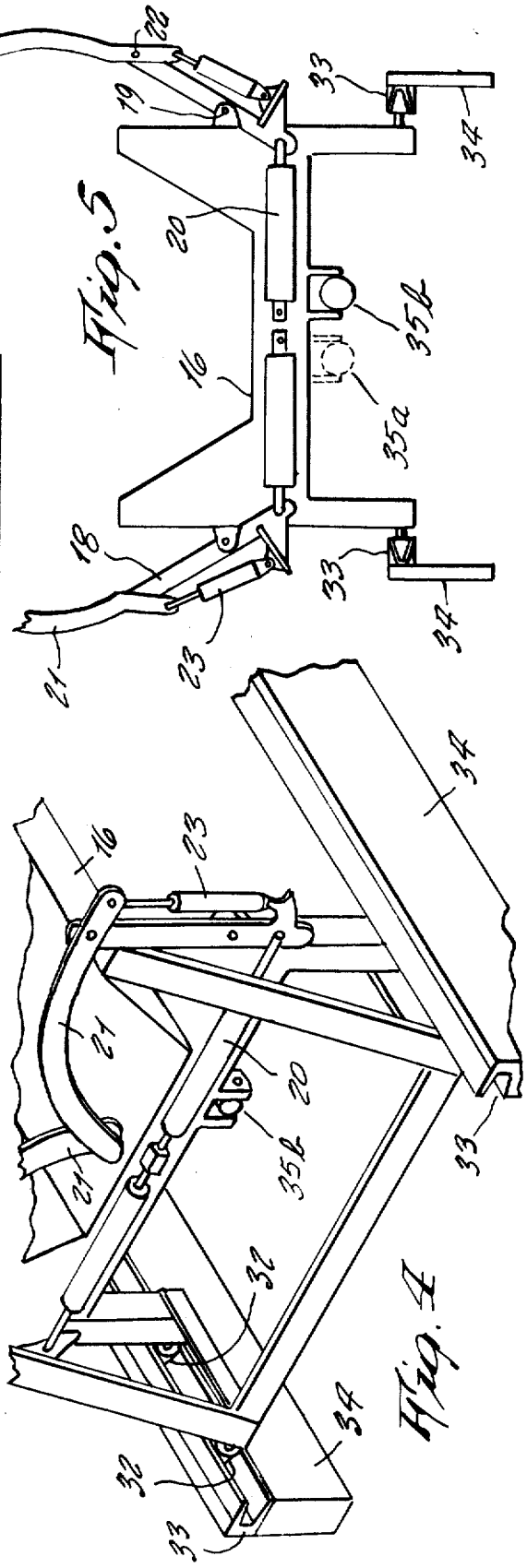
Fig. 3
Fig. 5
Fig. 4

GIANT TREE CHOPPER

This invention relates generally to shredding machinery.

A principal object of the present invention is to provide a giant tree chopper for disintegrating chopped down trees and brush especially at a construction site.

Another object is to provide a giant tree chopper which will produce wood chips that can then be more easily disposed or used as a mulch in gardening and landscaping, thereby eliminating the need of burning to clear the site, and which due to concern at this time for air pollution has become an objectionable, and in some areas not permitted, practice.

Other objects are to provide a giant tree chopper which is simple in design, inexpensive to manufacture, rugged in construction, easy to use, and efficient in operation.

These and other objects will be readily evident upon a study of the following specification and the accompanying drawing, wherein:

FIG. 1 is a front perspective view of the invention.

FIG. 2 is a rear view of the trough and the hydraulically operated breaker arm units for folding the tree limbs against the tree trunk and hold the same down during the chopping-up operation.

FIG. 3 is a diagrammatic side view.

FIG. 4 is a fragmentary rear perspective view.

FIG. 5 is a rear elevation view.

Referring now to the drawing in detail, the reference numeral 10 represents a giant tree chopper according to the present invention, wherein there is a chassis or frame 11 mounted at its rear end upon tandem axles supported upon sets of wheels 12 fitted with high strength rubber tires 13. The front end of the frame can include a kingpin under which a truck tractor with a fifth wheel would back up for coupling so the equipment could be transported on a highway. A detachable dolly 14 would support the front end at a wood clearing site so to free the tractor for other uses. Two pairs of hydraulically operated outriggers 15 can be pulled out sidewardly to support and stabilize the machine while it is working.

A V-shaped trough 16, shown as semi-hexagonal in contour, is mounted longitudinally on the frame, the trough serving to receive cut down trees with their limbs attached. On each side of the trough a pair of units 17 serve to break and hold the tree branches close to the tree trunk lying in the trough. Each unit 17, as shown in FIG. 2, includes a leg 18 pivotable about pin 19 and activated by a hydraulic cylinder 20. Each leg supports a breaking and holding arm 21 pivotable about a pin 22. A hydraulic cylinder 23 supported on the leg pivots the arm between the positions shown in solid lines and dotted lines in FIG. 2, so that the arms reach into the trough.

At a front end of the trough, a cutter wheel unit 24 is supported on the frame, and contains a cutter wheel rotated on a shaft 25. The cutter wheel includes radial knife blades that grind and shred the end of the tree as the tree is fed into it by a cleated feeder wheel 26.

A platform 27 on the front end of the frame supports a drive motor unit 28 together with a suitable gear reduction unit and to which the shaft 25 is connected. A gear 29 on a side of the cleated feeder wheel is direct gear driven by a hydraulic motor with a gear box. It powers the cleated feeder wheel placed upon the tree so as to pull the tree into the cutter wheel. Hydraulic cylinders 30 operate the arms 31 which support and urge the cleated feeder wheel frictionally against the tree.

Suggested dimensions for the machine are 53 feet long by 11 feet wide and 13 feet high. It is designed to take trees having trunks up to 42 inches in diameter.

As shown in FIG. 3, the troughing feeder table is hydraulically operated to telescope by feeder cylinders 35a and 35b. The telescoping parts of the troughing feeder table are supported on rollers 32 travelling in a channeled track 33 supported on the frame 34. The telescoping parts travel seven feet with each set of breaker arms attached. Short cylinder 35a is connected to the middle feeder trough, and long cylinder 35b is connected to the end feeder trough.

I claim:

1. Mobile apparatus having a frame on which is carried a rotary cutter member for fragmentizing whole trees and tree trunks, wherein the improvement comprises a plurality of horizontal telescoping trough members for supporting the tree trunk longitudinally of said frame and in position to be fed endwise against said rotary cutter member, transversely spaced guide channels on said frame, and anti-friction rollers on said telescoping trough members cooperatively engaging in said channels whereby to movably support said trough members for movement longitudinally of said frame.

2. Mobile apparatus according to claim 1, further comprising motor means for moving said trough members to different relative longitudinal positions to support tree trunks of different lengths.

3. Mobile apparatus according to claim 2, wherein said motor means comprises a plurality of fluid pressure operated cylinders, at least one of which is interposed between said frame and each of said trough members.

4. Mobile apparatus according to claim 1, wherein each of said trough members carries thereon a unit activatable to confine and bend the branches of a tree toward said trough members at longitudinally spaced points along said frame.

5. Mobile apparatus according to claim 4, wherein each of said units comprises a pair of vertically oriented legs pivotally mounted on opposite sides respectively of a trough member in substantially transverse alignment with each other, motor means for selectively pivoting said legs concurrently apart or concurrently toward each other, an arm pivotally carried adjacent the upper end of each leg, and motor means carried by each leg for pivoting the corresponding said arm from a position in substantial alignment with the leg to an angular position in which said legs and arms cooperate to confine and bend the branches of a tree towards the trough members.

* * * * *